US008693451B2

(12) United States Patent
Kholaif et al.

(10) Patent No.: US 8,693,451 B2
(45) Date of Patent: Apr. 8, 2014

(54) METHODS AND APPARATUS FOR USE IN CONTROLLING AN ACCESS POINT MODE OF OPERATION FOR A MOBILE TERMINAL

(75) Inventors: Ahmad Mohammad Mohammad Kholaif, Waterloo (CA); Rudy Eugene Rawlins, Waterloo (CA)

(73) Assignee: Blackberry Limited, Waterloo (CA)

( * ) Notice: Subject to any disclaimer, the term of this patent is extended or adjusted under 35 U.S.C. 154(b) by 353 days.

(21) Appl. No.: 13/011,118

(22) Filed: Jan. 21, 2011

(65) Prior Publication Data

US 2012/0188991 A1    Jul. 26, 2012

(51) Int. Cl.
*H04W 4/00*        (2009.01)
*H04L 12/28*      (2006.01)

(52) U.S. Cl.
USPC .......................................... 370/338; 370/254

(58) Field of Classification Search
USPC ......................... 370/254, 328, 338
See application file for complete search history.

(56) References Cited

U.S. PATENT DOCUMENTS

| | | | |
|---|---|---|---|
| 6,920,171 B2 | 7/2005 | Souissi et al. | |
| 7,221,904 B1 | 5/2007 | Gavrilovich | |
| 8,055,256 B2 | 11/2011 | Rudowicz et al. | |
| 8,090,395 B2 | 1/2012 | Ngai et al. | |
| 2005/0078624 A1 | 4/2005 | Shu et al. | |
| 2005/0154933 A1 | 7/2005 | Hsu et al. | |
| 2005/0288021 A1* | 12/2005 | Hunkeler | 455/436 |
| 2006/0077997 A1 | 4/2006 | Yamaguchi et al. | |
| 2006/0239209 A1* | 10/2006 | Ayyagari et al. | 370/254 |
| 2007/0079376 A1 | 4/2007 | Robert et al. | |
| 2007/0086378 A1 | 4/2007 | Matta et al. | |
| 2007/0140191 A1 | 6/2007 | Kojima | |
| 2007/0183338 A1 | 8/2007 | Singh et al. | |
| 2008/0025233 A1 | 1/2008 | Otsuka | |
| 2009/0262673 A1 | 10/2009 | Hermersdorf | |
| 2009/0290520 A1 | 11/2009 | Roberts et al. | |
| 2010/0029325 A1 | 2/2010 | Wang et al. | |

(Continued)

FOREIGN PATENT DOCUMENTS

| | | |
|---|---|---|
| EP | 1643686 A3 | 8/2006 |
| WO | 2008048650 A2 | 4/2008 |
| WO | 2009113557 A1 | 9/2009 |

OTHER PUBLICATIONS

European Search Report & Written Opinion, EP patent application # 011151734, Jun. 7, 2011.

(Continued)

*Primary Examiner* — Noel Beharry
*Assistant Examiner* — Farhad Ali
(74) *Attorney, Agent, or Firm* — Ridout & Maybee LLP

(57) ABSTRACT

Techniques for use in controlling an access point mode of operation of a mobile terminal are described. Initially, the mobile terminal operates in the access point mode of operation for communication with one or more other mobile terminals. While operating in the access point mode, the mobile terminal receives, from the one or more other mobile terminals, network information comprising one or more network identifiers which identify one or more wireless networks within coverage of the one or more other mobile terminals. The mobile terminal disables the access point mode of operation in response to identifying that at least one of the received network identifiers corresponds to a predetermined wireless network or predetermined type of wireless network. In one example, the mobile terminal is operative in accordance with IEEE 802.11, the received network identifiers comprise service set identifiers (SSIDs), and the predetermined wireless network is an enterprise network.

20 Claims, 7 Drawing Sheets

(56) References Cited

U.S. PATENT DOCUMENTS

2010/0165879 A1 7/2010 Gupta et al.
2010/0296441 A1 11/2010 Barkan
2011/0237253 A1 9/2011 Hallenstal et al.

OTHER PUBLICATIONS

U.S. Appl. No. 13/021,331, filed Feb. 4, 2011.
Choi, Richin—Canadian Intellectual Property Office, "Office Action" for Canadian Patent Application No. 2,758,573 dated Aug. 20, 2013.

* cited by examiner

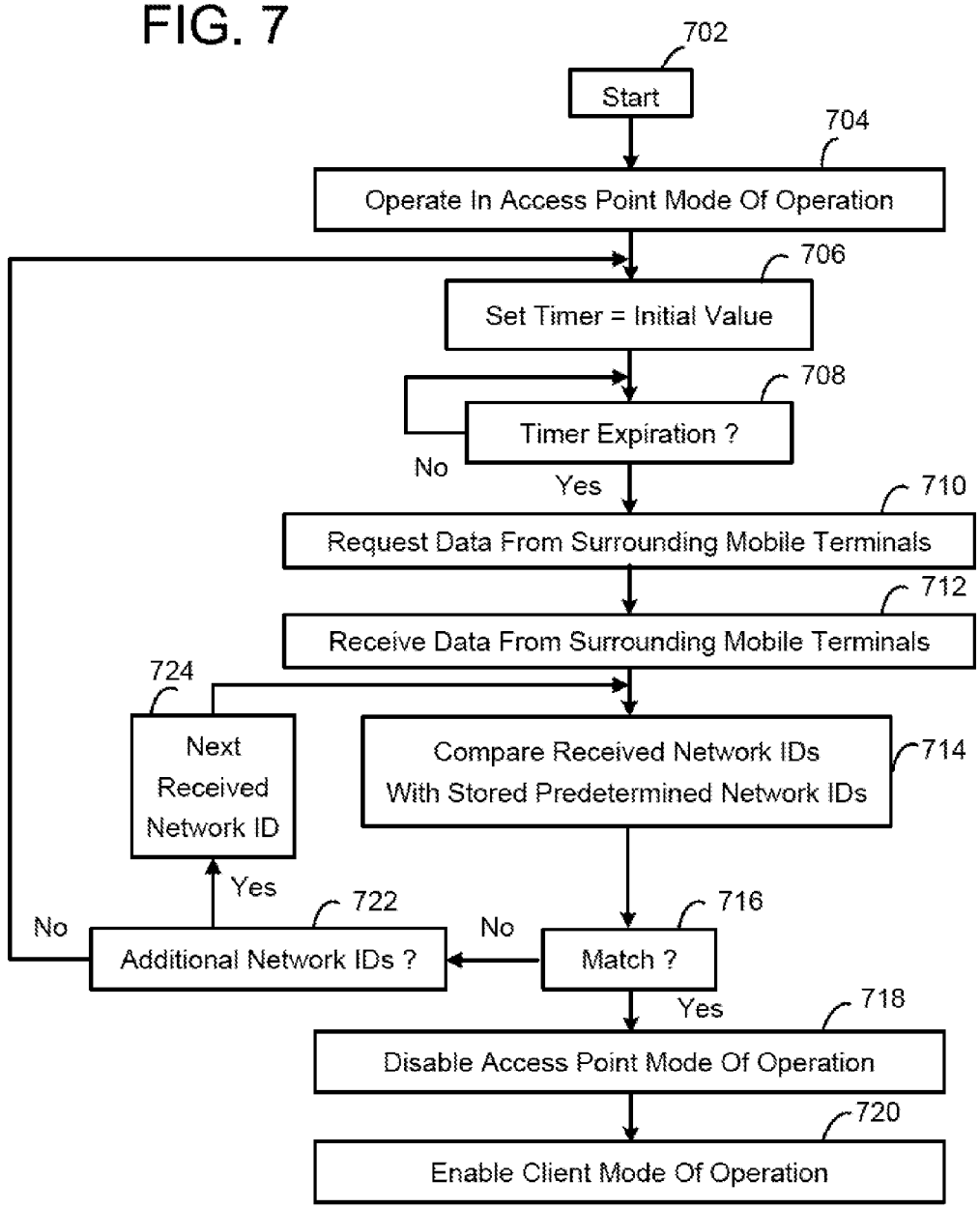

METHODS AND APPARATUS FOR USE IN CONTROLLING AN ACCESS POINT MODE OF OPERATION FOR A MOBILE TERMINAL

BACKGROUND

1. Field of the Technology

The present disclosure relates generally to radio communications, and more particularly to techniques for use in controlling an access point mode of operation for a mobile terminal.

2. Description of the Related Art

Mobile communication devices (e.g. end stations or "STAs") configured to operate in accordance with IEEE 802.11 standards or the like may communicate in wireless local area networks (WLANs). Such mobile devices may be further configured to enter and operate in an access point (AP) mode of operation (e.g. in an "infrastructure mode" or "micro-AP mode"), so that other communication devices may associate with them for "direct" RF communications therebetween, i.e. without the data traversing any fixed wireless network infrastructure.

Unfortunately, such "mobile APs" may be undesirable sources of interference, for example, to some WLAN installations, such as enterprise WLAN installations. Thus, IT policies in enterprises could require or advocate that such mobile devices disable the feature once in coverage of their WLAN. While mobile devices are operating as mobile APs, however, they are unable to perform scanning operations for the identification of other WLANs, since they must be tuned to an AP operation channel to provide suitable communications for associated devices.

Other networks and environments may experience the same or similar problems. What are needed are methods and apparatus to overcome these and other related deficiencies of the prior art.

BRIEF DESCRIPTION OF THE DRAWINGS

Embodiments of present invention will now be described by way of example with reference to attached figures, wherein:

FIG. 7 is a flowchart for use in describing a method for use in controlling an AP mode of operation of a mobile device.

DETAILED DESCRIPTION OF THE PREFERRED EMBODIMENTS

Techniques for use in controlling an access point mode of operation of a mobile terminal are described. Initially, the mobile terminal operates in the access point mode of operation for communication with one or more other mobile terminals. While operating in the access point mode, the mobile terminal receives, from the one or more other mobile terminals, network information comprising one or more network identifiers which identify one or more wireless networks within coverage of the one or more other mobile terminals. The mobile terminal disables the access point mode of operation in response to identifying that at least one of the received network identifiers corresponds to a predetermined wireless network or predetermined type of wireless network. In one example, the mobile terminal is operative in accordance with IEEE 802.11, the received network identifiers comprise service set identifiers (SSIDs), and the predetermined wireless network is an enterprise network.

Figure 1:
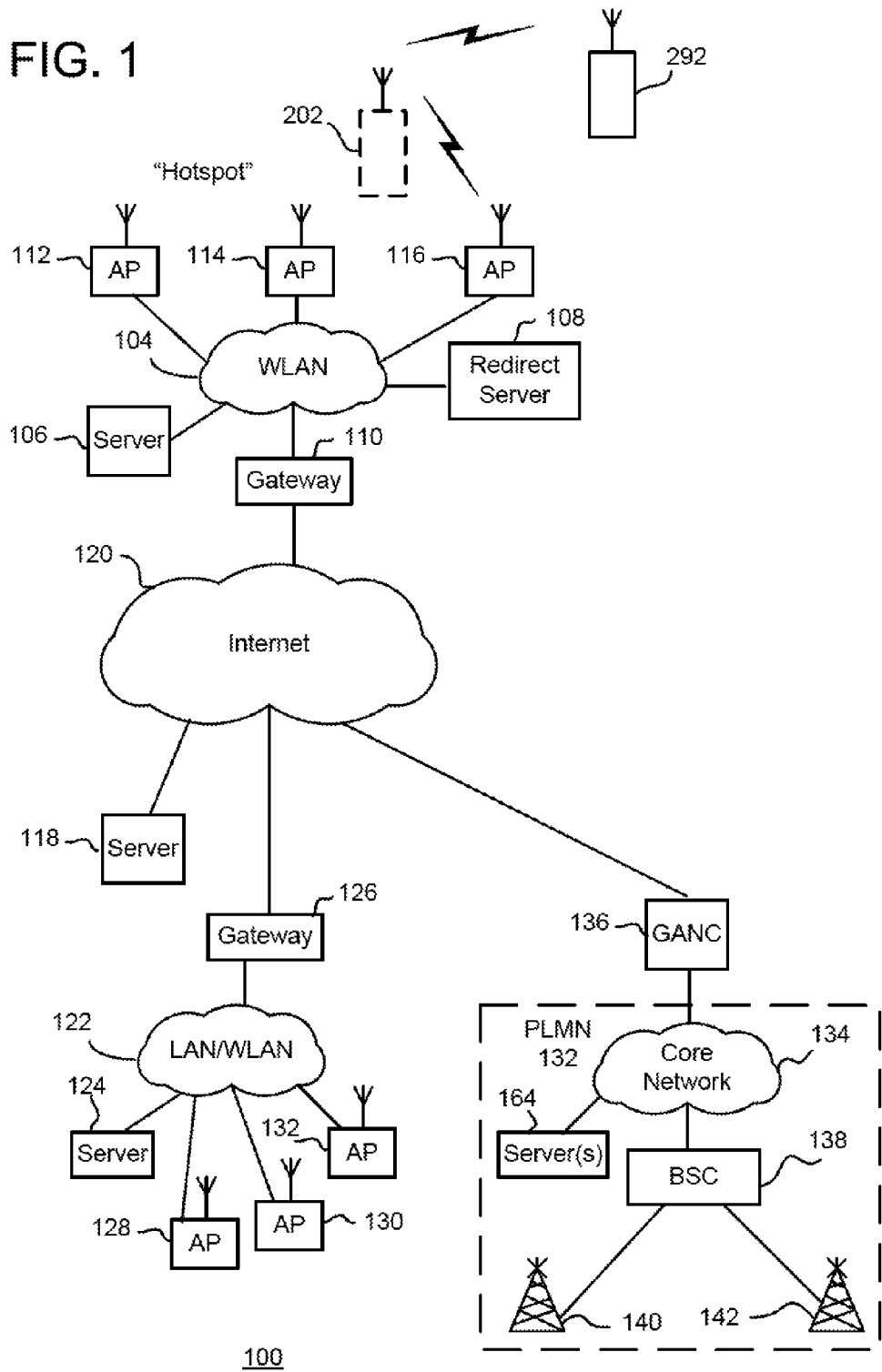
FIG. 1 is an illustrative representation of a communication system which includes a wireless communication network (e.g. a WLAN) within a mobile communication device (e.g. an end station or "STA") may operate.

To illustrate one exemplary network architecture within which the techniques of the present disclosure may be practiced, FIG. 1 is a communication system 100 which includes a wireless local area network (WLAN) 104 within which a mobile communication device 202 (e.g. an end station or "STA") may operate. WLAN 104 includes a wireless access points (AP) 116 for wireless communications with mobile device 202. In the present embodiment, WLAN 104 and mobile device 202 operate in accordance with IEEE 802.11 standards. Such WLANs are identifiable by a mobile device 202 from a Set Service Identifier (SSID) or Extended SSID (ESSID). WLAN 104 also includes one or more servers 106, a redirect server 108, and a gateway 110. Server 106 may provide data, applications, and/or functionality for communication services in WLAN 104.

Mobile device 202 may also operate for communications in different LANs/WLANs, such as WLAN 122. WLAN 122 has a plurality of wireless APs 128, 130 and 132, one or more servers 124, and a gateway 126. In this embodiment, WLAN 122 is a private communication network of an enterprise (small company, corporation, etc.) associated with mobile device 202. Each wireless access point 128, 130, and 132 may be associated with and identified by a basic service set identifier (BSSID).

WLANs 104 and 122 may provide or allow access to various data and communication services to its terminals. For example, the WLANs may provide for access to Internet 120 via the Web browser application, or voice telephony communication services with use of Voice over IP (VoIP) communications or other techniques.

For "push-type" data or message synchronization services, mobile device 202 is enabled to maintain data synchronization with a server (e.g. server 106 or 118) for user data of an application associated with a user account. The application of mobile device 202 and the server may be or include, for example, an electronic mail (e-mail) application program for the communication of e-mail messages. In this case, the data synchronization is a message synchronization for the e-mail messages associated with the user account for an e-mail application program. The data synchronization may alternatively or additionally be or include an address book synchronization for address book contacts in an address book organizer, or a calendar appointment synchronization for calendar appointments in a calendar application program. These and other applications of mobile device 202 are also identified later in relation to FIG. 5. For the data-synchronized communications, the server maintains storage of a mapping of a user account name or identifier of the user account with a personal identification number of mobile device 202. When communications are required with mobile device 202, the personal identification number is used to route the messages to/from mobile device 202 through communication system 100.

In contrast to WLAN 122, WLAN 104 may be a public WiFi "hotspot" for public use and include what is referred to as a "captive portal" or "walled garden." For devices connected in WLAN 104 via wireless AP 116, gateway 110 is configured to permit or deny access to the data, applications, and/or functionality, as well as to permit or deny external access outside of WLAN 104 to Internet 120. To do this, gateway 110 has a set of IP address filters which define a set of addresses that are permissible/impermissible, if any at all, for access by devices. Access by a device depends on whether or not a device has been authorized and what access rights are given upon authorization. Typically, when a request by a device in WLAN 104 is made prior to proper authorization, gateway 110 is configured to redirect the request to redirect server 108. In response, redirect server 108 is configured to respond to mobile device 202 to provide data for producing information (e.g. a Web page information) which is rendered in a visual display of mobile device 202 via a Web browser application. The information may solicit a user response. For example, the information may solicit a user registration or login with user fields for entering a user name and/or password information. The user will enter a user response via the Web browser application, for example, which is sent by mobile device 202 and received by gateway 110. Gateway 110 identifies whether the received user response is sufficient (e.g. whether the user name and password match prestored user name and password information, whether the user payment is accepted, whether the user acceptance is confirmed, etc.). If the user response is deemed sufficient, gateway 110 permits access to the data, applications, and/or functionality in or outside of WLAN 104.

Again, in contrast to WLAN 104, WLAN 122 may be a private communication network of an "enterprise" associated with mobile device 202. For devices attempting to access WLAN 122 via Internet 120, gateway 126 is configured to permit or deny internal access to the data, applications, and/or functionality in WLAN 122. For devices connected in WLAN 122 via one of wireless APs 128, 130, and 132, gateway 126 may be configured to permit or deny access to the data, applications, and/or functionality offered via WLAN 122 depending on whether or not a device has been authorized and what access rights are given upon authorization.

Devices may also be configured for communications in accordance with Generic Access Network (GAN) technologies. Using GAN based technologies, mobile device 202 may also access communication services from a core network 134 of a Public Land Mobile Network (PLMN) 132 (e.g. cellular). GAN technology may provide, amongst other things, a voice communication service for mobile device 202 via the WLAN hotspot. PLMN 132 includes a core network 136, a plurality of base station controllers such as a base station controller (BSC) 138 coupled to core network 136, and a plurality of base stations such as a base station (BS) 140 and a base station 142 coupled to associated BSCs 138. Core network 136, BSC 138, and BS 140 operate in a conventional fashion as well-documented. Other PLMNs in the environment have a similar or the same architecture as PLMN 132. Such environments may be referred to as cellular telecommunications networks.

Communications between WLAN 104 and core network 134 of PLMN 132 may be facilitated through a suitable connecting network such as a broadband, wide-area IP communication network (e.g. the Internet 120) or any suitable public or private wide area network. Gateway/controller or GAN controller (GANC) 136 is provided between the Internet 120 and core network 134 of PLMN 132 in order to facilitate access to core network 134 by terminals through alternative links (e.g. radio link of wireless AP 116) different than those conventional radio links offered in the PLMN 132 (e.g. radio links of base stations 140 and 142). Thus, mobile device 202 may also access services of core network 134 of PLMN 132 via WLANs, such as WLAN 104, through use of a WLAN radio interface as opposed to a cellular telephony interface. For such communications, GANC 136 and mobile device 202 are configured to establish and maintain a (secure) tunnel connection between each other through the intervening networks.

As will be described in more detail later below, mobile device 202 may be configured to enter into an access point (AP) mode of operation, so that other communication devices (such as a mobile device 292 of FIG. 1) may associate with it for direct RF communications therebetween. This AP mode of operation, which may be alternatively referred to as an "infrastructure mode" or "micro-AP mode", provides a benefit due to the high data rates available over WLAN links. Here, the data may be communicated "directly" between the mobile devices 202 and 292, i.e. without the data traversing any fixed wireless network infrastructure.

Figure 2:
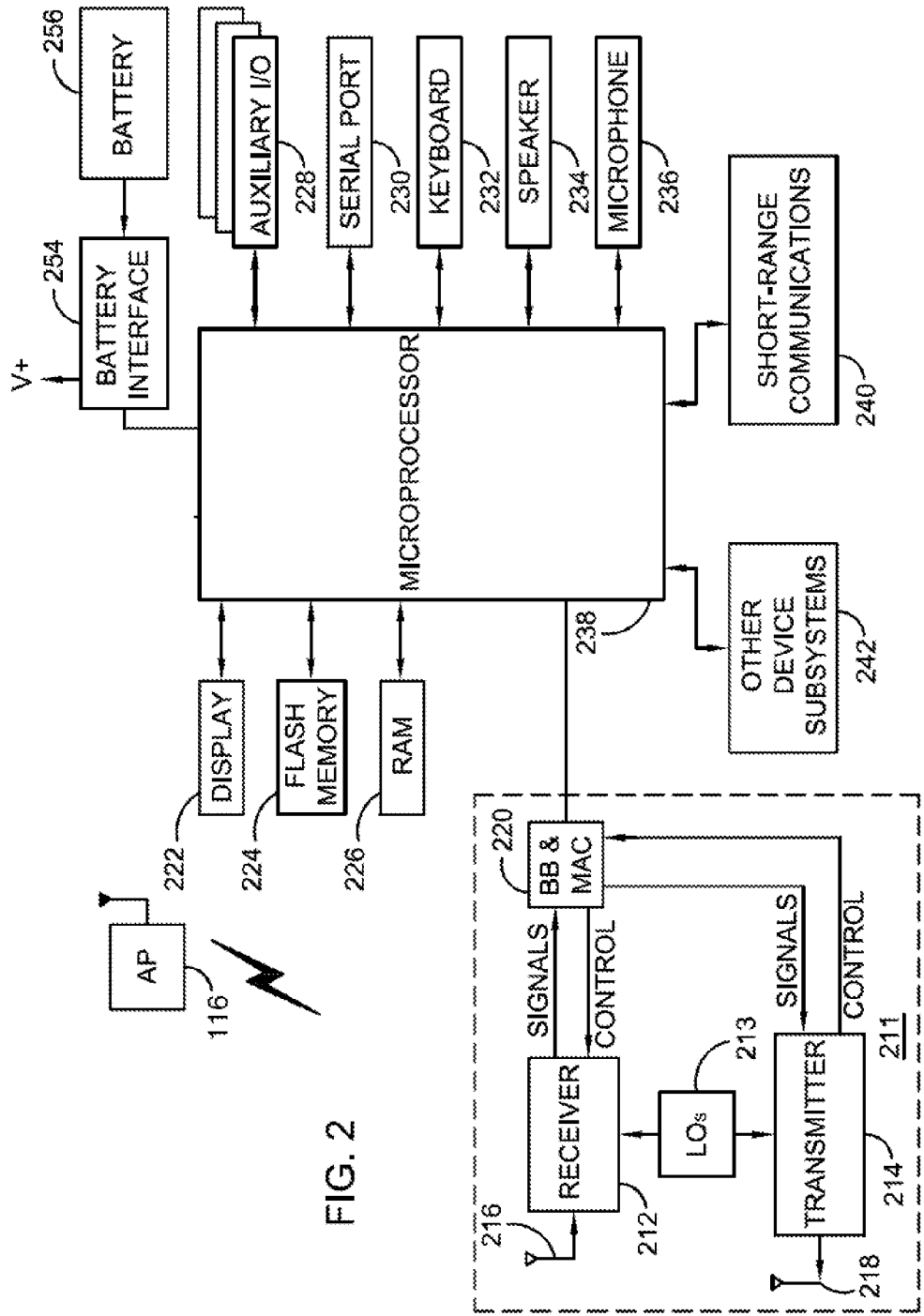
FIG. 2 is a schematic block diagram of a particular type of mobile device.

Referring now to FIG. 2, electrical components of a typical mobile communication device 202 (e.g. an end station or "STA", a mobile station, mobile terminal, or user equipment "UE", or the like) which operates with wireless APs of communication system 100 of FIG. 1 will be described. Mobile device 202 may be representative of one or more terminals shown and described in relation to FIG. 1. Mobile device 202 may be a two-way communication device having at least voice and/or advanced data communication capabilities, including the capability to communicate with other computer systems. Also, mobile device 202 may be a wireless communication device which operates in accordance with an IEEE 802.11 standards. Depending on the functionality provided by mobile device 202, it may be referred to as a data messaging device, a two-way pager, a cellular-type telephone with data messaging capabilities, a wireless Internet appliance, or a data communication device (with or without telephony capabilities).

As shown in FIG. 2, mobile device 202 is configured to wirelessly communicate with wireless APs of WLANs, such as AP 116 of WLAN 104 of FIG. 1. For communication with AP 116, mobile device 202 utilizes a communication subsystem 211. Depending on the type of device, mobile device 202 may also be configured to wirelessly communicate with other systems such as cellular telecommunication systems. With such configuration, mobile device 202 may be referred to as a "dual mode" mobile device. Although mobile device 202 may have separate and independent subsystems for these purposes, at least some portions or components of these otherwise different subsystems may be shared where possible.

Communication subsystem 211 includes a receiver 212, a transmitter 214, and associated components, such as one or more (e.g. embedded or internal) antenna elements 216 and 218, local oscillators (LOs) 213, and a processing module such as a baseband (BB) and media access control (MAC) processing module 220. Communication subsystem may be or referred to as a radio frequency (RF) transceiver or wireless transceiver. As will be apparent to those skilled in the field of communications, the particular design of communication subsystem 211 depends on the communication network in which mobile device 202 is intended to operate. In the present disclosure, communication subsystem 211 (including its associated processor/processing components) are operative in accordance with IEEE 802.11 standards.

Mobile device 202 may send and receive communication signals through the network after required network procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in BB/MAC processing module 220. In a similar manner, signals to be transmitted are processed, including modulation and encoding, for example, by BB/MAC processing module 220. These processed signals are input to transmitter 214 for digital-to-analog (D/A) conversion, frequency up conversion, filtering, amplification and transmission through the network via antenna 218. BB/MAC processing module 220 not only processes communication signals, but may also provide for receiver and transmitter control. Note that receiver 212 and transmitter 214 may share one or more antennas through an antenna switch (not shown in FIG. 2), instead of having two separate dedicated antennas 216 and 218 as shown.

Since mobile device 202 may be a handheld portable battery-powered device, it also includes a battery interface 254 for receiving one or more rechargeable batteries 256. Such a battery 256 provides electrical power to most if not all electrical circuitry in mobile device 202, and battery interface 254 provides for a mechanical and electrical connection for it. Battery interface 254 is coupled to a regulator (not shown in FIG. 2) that provides a regulated voltage V to all of the circuitry.

Mobile device 202 includes a microprocessor 238 (on& type of processor or controller) that controls overall operation of mobile device 202. This control includes the AP mode control techniques of the present disclosure. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a (short-range) communication subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Keyboard 232 may be a complete alphanumeric keyboard and/or telephone-type keypad. On the other hand, keyboard 232 and display 222 may be replaced or enhanced with- a touch screen display or other suitable input mechanism, or replaced or enhanced with a voice-activated input module.

Operating system software used by microprocessor 238 may be stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226. Microprocessor 238, in addition to its operating system functions, enables execution of software applications on mobile device 202. A predetermined set of applications that control basic device operations, including data and/or voice communication applications, will normally be installed on mobile device 202 during its manufacture. This includes applications or modules which are configured to perform the network selection techniques of the present disclosure. For this reason, microprocessor 238 (and any other processor(s) or modules of mobile device 202) may enable execution of particular applications or modules for performing enhanced network selection techniques for access to multiple aggregator services.

Another application that may be loaded onto mobile device 202 may be a personal information manager (PIM) application having the ability to organize and manage data items relating to user such as, but not limited to, e-mail, calendar events, voice mails, appointments, and task items. The PIM application has the ability to send and receive data items via the wireless network. In one embodiment, PIM data items are seamlessly integrated, synchronized, and updated via the wireless network, with the wireless device user's corresponding data items stored and/or associated with a host computer system thereby creating a mirrored host computer on mobile device 202 with respect to such items. This is especially advantageous where the host computer system is the wireless device user's office computer system. Additional applications may also be loaded onto mobile device 202 through network, an auxiliary I/O subsystem 228, serial port 230, (short-range) communication subsystem 240, or any other suitable subsystem 242, and installed by a user in RAM 226 or a non-volatile store (not shown) for execution by microprocessor 238. Such flexibility in application installation increases the functionality of mobile device 202 and may provide enhanced on-device functions, communication-related functions, or both. For example, secure communication applications may enable electronic commerce functions and other such financial transactions to be performed using mobile device 202.

In a data communication mode, a received signal such as a text message, an e-mail message, or web page download will be processed by communication subsystem 211 and input to microprocessor 238. Microprocessor 238 may further process the signal for output to display 222 or alternatively to auxiliary I/O device 228. A user of mobile device 202 may also compose data items, for example, using keyboard 232 in conjunction with display 222 and possibly auxiliary I/O device 228. The composed items may be transmitted over a communication network through communication subsystem 211.

For voice communications, the overall operation of mobile device 202 is substantially similar, except that the received signals would be output to speaker 234 and signals for transmission would be generated by microphone 236. Alternative voice or audio I/O subsystems, such as a voice message recording subsystem, may also be implemented on mobile device 202. Although voice or audio signal output may be accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile device 202 by providing for information or software downloads to mobile device 202 other than through a wireless communication network. The alternate download path may, for example, be used to load an encryption key onto mobile device 202 through a direct and thus reliable and trusted connection to thereby provide secure device communication.

Short-range communications subsystem 240 of FIG. 2 is an additional component that provides for communication between mobile device 202 and different systems or devices, which need not necessarily be similar devices. In this embodiment, communication subsystem 240 is a BLUETOOTH® communication module to provide for communication with similarly enabled systems and devices. Note that the BLUETOOTH® standards may be defined by or based on BLUETOOTH® Specification Version 2.0, Volumes 1 and 2, for example.

Figure 4:
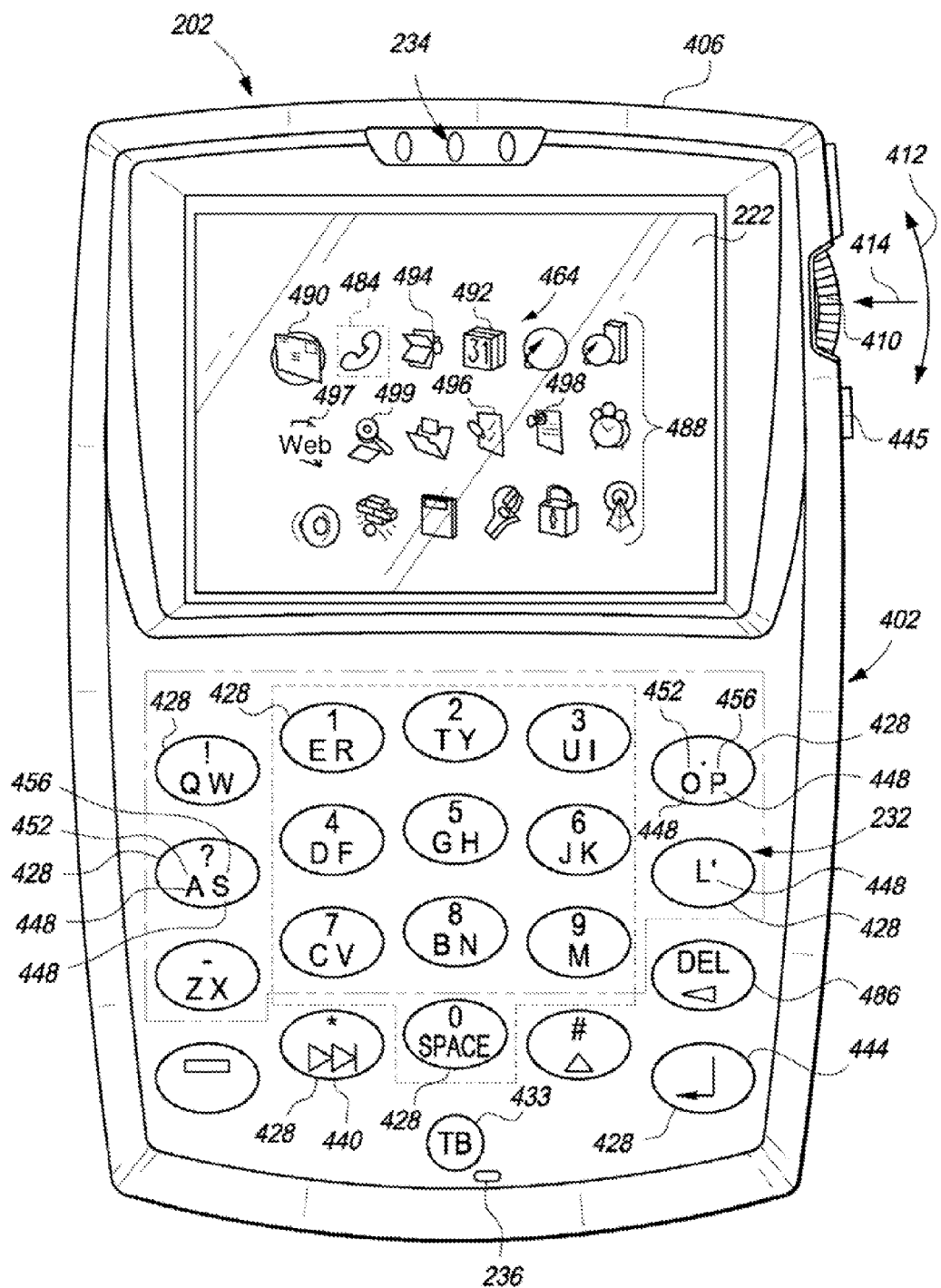
FIG. 4 is an illustrative example of an exemplary user interface of the mobile device of FIGS. 1 and 2.

Referring ahead now to FIG. 4, which is shown is an illustrative representation of an exemplary user interface 402 of a mobile device (mobile device 202 or 292 of FIGS. 1 and 2). Although shown enlarged in FIG. 4 for clarity, this mobile device 202 is sized to be a handheld portable device. Mobile device 202 includes at least display 222, keyboard 232, speaker 234, microphone 236, and an I/O positioning mechanism 410. I/O positioning mechanism 410 may be utilized to position a cursor in display 222, select displayed items in display 222, and/or change (e.g. by panning) the view which is displayed in display 222. The cursor may be or include a pointer, a movable item or other visual cue used to mark a position or point to another item on a display, in order to, for example, indicate position for data entry or for selection of the other item. In the embodiment shown, I/O positioning mechanism 410 is a scrollwheel mounted on a side of the housing. As an alternative to or in addition to use of a scrollwheel, a wide range of one or more I/O positioning mechanisms may be employed, such as a trackball, a touch pad, a joystick button, a mouse, a touchscreen, a tablet, or other whether presently known or unknown.

In the present embodiment, keys 428 of keyboard 232 are disposed on a front face of a housing 406. Keyboard 232 is in the example form of a reduced QWERTY keyboard including a plurality of keys 428 that serve as input members. It can be seen that the arrangement of the characters 448 on keys 428 of keyboard 424 is generally of the QWERTY arrangement, albeit with many of keys 428 including two of characters 448. In the example depiction of keyboard 424, many of keys 428 include two characters, such as including a first character 452 and a second character 456 assigned thereto. Characters may include letters, digits, symbols and the like and can additionally include ideographic characters, components thereof, and the like. One of keys 428 of keyboard 424 includes as the characters 448 thereof the letters "Q" and "W", and an adjacent key 428 includes as the characters 448 thereof the letters "E" and "R". Keyboard 424 may be of other configurations, such as an AZERTY keyboard, a QWERTZ keyboard, a Dvorak keyboard, or other keyboard or keypad arrangement, and either reduced or not reduced (i.e. full). In a "full" or non-reduced keyboard or keypad arrangement, each key has a single letter (not multiple letters) of the alphabet assigned to it.

Among keys 428 of keyboard 232 are a <NEXT>key 440 and an <ENTER>key 444. The <NEXT>key 440, wherein, for example, "<NEXT>" may be a symbol or may be the word "next" provided (e.g. printed) on the key, may be pressed to provide a selection input to the processor and provides substantially the same selection input as is provided by a rotational input of I/O positioning mechanism 410. Since <NEXT>key 440 is provided adjacent a number of other keys 428 of keyboard 232, the user can provide a selection input to the processor substantially without moving the user's hands away from the keyboard 232 during a text entry operation. Another key, the <ESC> key 445 is disposed on the side of housing 406 adjacent positioning wheel 438, although the same or similar key maybe disposed as part of keyboard 232. Among keys 428 of the keyboard 424 additionally is a <DEL> key 486 that can be provided to delete a text entry. I/O positioning mechanism 410 may serve as another input member and is both rotatable, as is indicated by an arrow 412, to provide selection inputs to the processor, and also can be pressed in a direction generally toward housing 406, as is indicated by an arrow 414 to provide another selection input to the processor.

Figure 3:
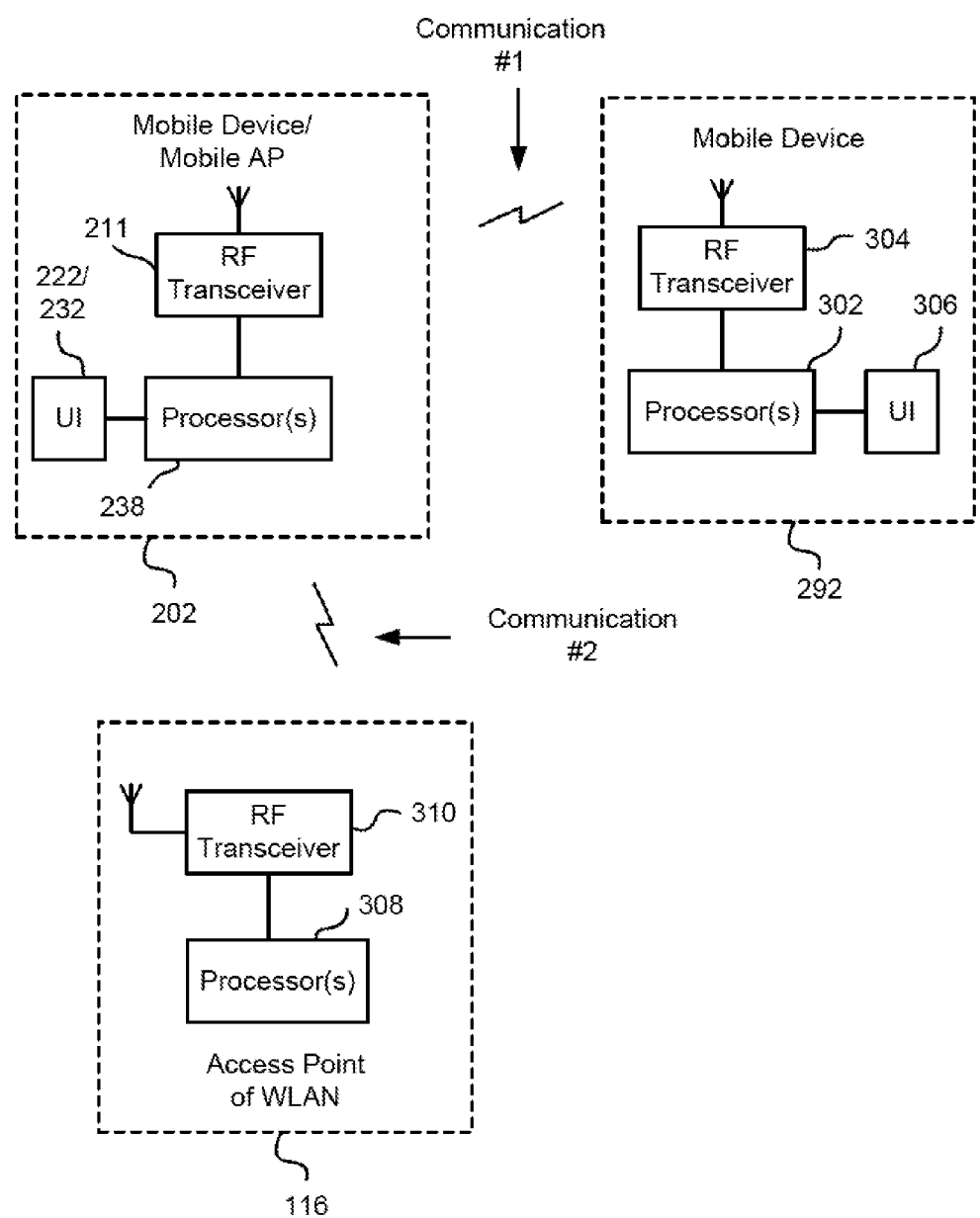
FIG. 3 is an illustrative example of the mobile device of FIGS. 1-2 which is operating in an access point (AP) mode of operation and communicating with another mobile device and an AP of the WLAN.

Display 222 may include a cursor 484 that depicts generally where the next input or selection from user interface 402 will be received. Display 222 is shown in FIG. 4 as displaying a home screen that represents a number of applications 586 (FIG. 3 shows some of the example possible applications 86) depicted as corresponding discrete icons 488. Icons 488 include, for example, an Electronic Mail (E-Mail) icon 490, a Calendar icon 492, an Address Book icon 494, a Tasks icon 496, a Messages icon 497, a MemoPad icon 498, and a Search icon 499, respectively.

Figure 5:
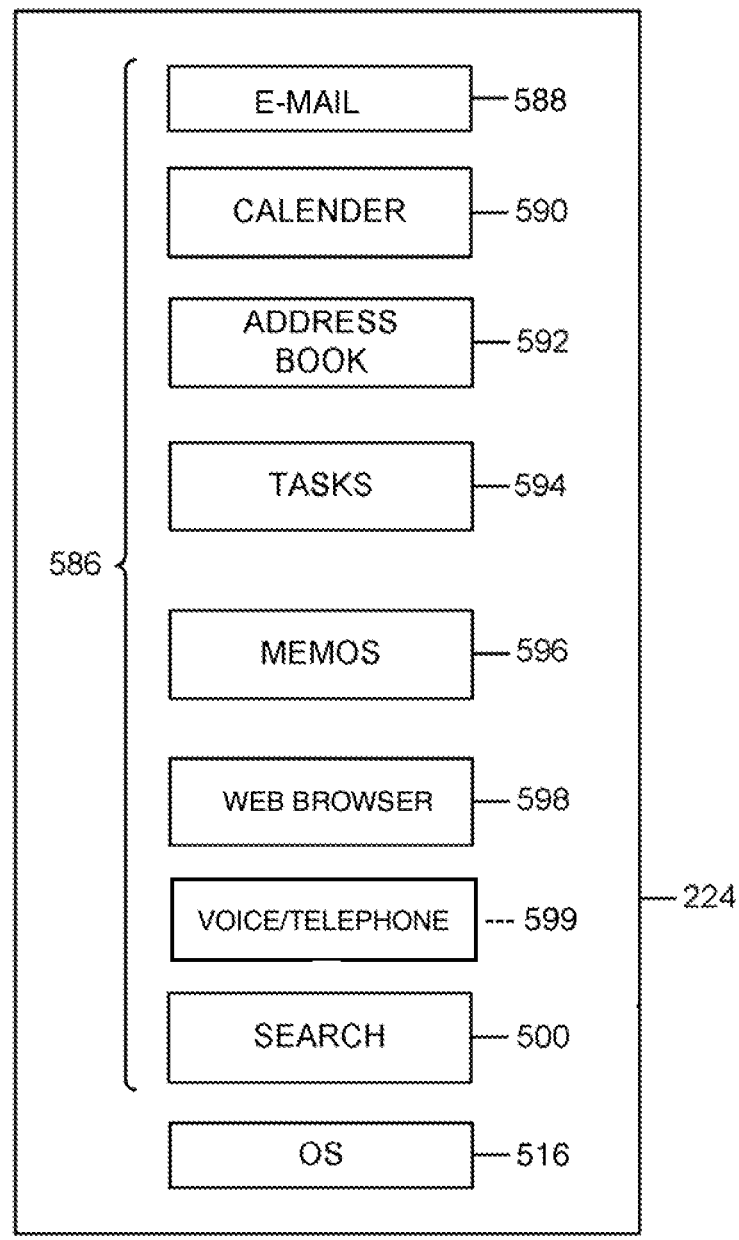
FIG. 5 is an illustrative representation of memory of a mobile device which includes a plurality of applications, many of which require some form of data communications.

As shown now further in FIG. 5, memory 224 of the mobile device includes a plurality of applications or routines 586 associated with the visually displayed icons 488 of FIG. 4 for the processing of data. Applications 586 may be in any of a variety of forms such as, without limitation, software, firmware, and the like. Applications 586 include, for example, an Electronic Mail (E-Mail) application 588 (FIG. 5) associated with E-mail icon 490 (FIG. 4), a Calendar application 590 (FIG. 5) associated with Calendar icon 492 (FIG. 4), an Address Book application 592 (FIG. 5) associated with Address Book icon 494 (FIG. 4), a Tasks application 594 (FIG. 5) associated with Tasks icon 496 (FIG. 4), a MemoPad (Memos) application 596 (FIG. 5) associated with MemoPad icon 498, a Web Browser application 598 (FIG. 5) associated with Web Browser icon 497 (FIG. 4), a Voice/Telephone application 599 (FIG. 5) associated with Voice/Telephone icon 484, and a Search application 500 (FIG. 5) associated with Search icon 499 (FIG. 4). An operating system (OS) program 516 also resides in memory 224.

The "home" screen output is shown in FIG. 4 as currently active and constitutes the main "ribbon" application for displaying the icons 488 shown.

An application, such as E-mail application 588 of FIG. 5, may then be initiated (opened or viewed) from user interface 402 by providing a suitable user input to it. For example, E-mail application 588 may be initiated (opened or viewed) by rotating I/O positioning mechanism 410 to highlight E-mail icon 490 and providing a selection input by translating I/O positioning mechanism 410 in the direction indicated by arrow 438. As another example, display 222 displays icon 499 associated with Search application 500 and accepts input from I/O positioning mechanism 410 to initiate a search from that icon 499. Applications 586 may be additionally or alternatively initiated (opened or viewed) from user interface 402 by providing another suitable input to it, e.g. by suitably rotating or "rolling" a trackball, and/or providing a selection input by, for example, pushing the trackball, or e.g. by touch-sliding a touchpad.

Movement, navigation, and/or scrolling with use of a cursor/view positioning mechanism is beneficial given the relatively large size of visually displayed information and the compact size of display 222 of FIG. 4, and since information and messages are typically only partially presented in the limited view of display 222 at any given moment. As previously described, I/O positioning mechanism 410 is one helpful cursor/view positioning mechanism to achieve such movement. I/O positioning mechanism 410, which may be referred to as a scrollwheel, specifically includes a circular disc which is rotatable about a fixed axis of housing 302 and may be rotated by the end user's index finger or thumb. When the information or message is being partially displayed, an upwards rotation of I/O positioning mechanism 410 causes an upwards scrolling such that display 222 presents viewing of an upper portion of the information or message. Similarly, a downwards rotation of I/O positioning mechanism 410 causes a downwards scrolling such that display 222 presents viewing of a lower portion of the information or message. I/O positioning mechanism 410 is mounted along a fixed linear axis such that the end user can depress I/O positioning mechanism 410 inwards toward housing 406 (e.g. with the end user's index finger or thumb) for selection of information. Again, see the direction indicated by an arrow 414 of I/O positioning mechanism 410 shown.

Although a specific mobile device 202 has just been described, any suitable mobile communication device or terminal may be part of the inventive methods and apparatus which will be described in fuller detail below. Note that many components of mobile device 202 shown and described may not be included (e.g. a full QWERTY keypad may be optional). Again, keyboard 232 and display 222 may be substituted or enhanced with a touch screen display or other suitable input mechanism, or enhanced or replaced with a voice-activated input module. Also, although the description of the architecture relates to a specific example for illustration, where the WLAN is an IEEE 802.11-based network, different environments may be applicable as well. The wireless network may be a WiMAX-based network (i.e. IEEE 802.16), or an Ultra-WideBand (UWB)-based network (i.e. IEEE 802.15), as a few examples.

Referring now back to FIG. 3, a simplified depiction of the various devices in communication system 100 of FIG. 1 are shown, devices which may be employed in the technique for use in controlling an access point (AP) mode of operation for a mobile terminal in accordance with the present disclosure. The devices in FIG. 3 include mobile device 202, mobile device 292, and AP 116 of the WLAN 104 (see e.g. FIG. 1).

Mobile device 202 of FIG. 3 is shown to include one or more processors 238 (e.g. microprocessor 238 of FIG. 2), a user interface 222/232 (e.g. display/keyboard 222/232 of FIG. 2) coupled to the one or more processors 238, and an RF transceiver module 211 (e.g. communication subsystem 211 of FIG. 2) coupled to the one or more processors 238 and to an antenna. Mobile device 292 may include one or more processors 302, a user interface 306 coupled to the one or more processors 302, an RF transceiver module 304 coupled to the one or more processors 302 and to an antenna. Mobile device 292 may be a mobile communication device (or an end terminal) which is similar in make, construction, and operation as mobile device 202. AP 116 of the WLAN includes one or more processors 308 coupled to an RF transceiver module 310, which is further coupled to an antenna.

As described earlier, mobile device 202 may be configured to enter and operate in an access point (AP) mode of operation. In the AP mode of operation, mobile device 202 may allow other communication devices (e.g. mobile device 292) to associate with it for direct RF communications therebetween. Here, data associated with any application may be communicated "directly" between devices 202 and 292 (e.g. Communication #1 of FIG. 3), i.e. without the data traversing any fixed wireless network infrastructure. Further, mobile device 202 may communicate or relay these data to/from an AP (e.g. AP 116) of the WLAN (e.g. Communication #2 of FIG. 3).

The AP mode of operation of mobile device 202, which may be referred to as an "infrastructure mode" or "micro-AP mode," provides a benefit with high data rates available over WLAN links. Unfortunately, such "mobile APs" may be undesirable sources of interference, for example, to some WLAN installations, such as to enterprise WLAN installations. Thus, IT policies in enterprises could require or advocate that such mobile devices disable the AP mode once in coverage of the WLAN. While mobile devices are operating as mobile APs, however, they are unable to perform scanning operations for the identification of other WLANs (e.g. enterprise configurations), since they must be tuned on an AP operation channel to provide suitable communications for its associated devices.

Referring ahead now to FIG. 7, a flowchart of an illustrative method for use in controlling an access point (AP) mode of a mobile terminal is shown. The method of FIG. 7 may be performed by mobile device 202 described in relation to FIGS. 1-6 and utilize the environment, components, and associated devices as described. In general, the techniques described in relation to the flowchart of FIG. 7 may be performed by one or more controllers or processors of the mobile terminal with use of its RF transceiver. A computer program product which may embody the technique may include a computer readable medium (e.g. memory of the communication device, computer disk, CD-ROM, etc.) having computer instructions stored therein which are executable by the one or more processors of the mobile terminal for performing the technique.

Beginning at a start block 702 of FIG. 7, the mobile terminal enters into an access point (AP) mode of operation (step 704 of FIG. 7). This mode of operation may alternatively be referred to as an "infrastructure mode" or "micro-AP mode." In the AP mode of operation, the mobile terminal operates as an AP so that other communication devices may associate with it for direct RF communications therebetween. During this AP mode of operation, the mobile terminal may be referred to as a "mobile AP." Here, data associated with any application may be communicated "directly" between the terminals, i.e. without the data traversing any fixed wireless network infrastructure. The mobile terminal may further communicate or relay these data to/from an AP of the WLAN. See e.g. the discussion in relation to FIG. 3.

Although such operation is advantageous, the mobile AP may be an undesirable source of interference, for example, to some WLAN installations, such as to enterprise WLAN installations. Thus, upon entering the AP mode of operation, the mobile AP sets a timer to an initial value and runs the timer (step 706 of FIG. 7). The timer will be utilized to trigger the action of identifying surrounding wireless networks. The timer may have a value within the range of, for example, about 25 seconds to 600 seconds (e.g. being selected as part of a progressive backoff algorithm). Note that, while operating in the AP mode, the mobile AP is typically unable to perform a scanning operation using its RF transceiver for identifying other wireless networks within coverage, as it must maintain its tuning on an AP operation channel to provide communications for its associated terminals.

When the timer expires (step 708 of FIG. 7), the mobile AP sends, via its RF transceiver, a request message to one or more surrounding mobile terminals that are currently associated with it (step 710 of FIG. 7). In general, the request message includes a request for network information. In response, the mobile AP receives, via the RF transceiver, a response message from each one of the surrounding mobile terminals (step 712 of FIG. 7). The response message includes a response with the requested network information. The request and response are communicated directly between the terminals, i.e. without the data traversing any fixed wireless network infrastructure.

The network information may include one or more network identifiers which identify one or more wireless networks within coverage of the one or more other mobile terminals. In particular, this "local" network information may include network identifiers which may be or include service set identifiers (SSIDs) which uniquely identify WLANs within coverage of the mobile terminals. In one embodiment, the mobile AP receives a plurality of network identifiers from a plurality of different surrounding mobile terminals. Each mobile terminal obtains the network information from performing a scanning operation locally at the terminal.

In one embodiment, in steps 710 and 712, the mobile AP operates to send one or more requests for a measurement report to the other mobile terminals, and receives one or more measurement reports from the other mobile terminals in response. The measurement reports include the network information comprising the one or more network identifiers. In one embodiment, the mobile AP utilizes one of the formats defined in IEEE 802.11 standards for a station-assisted measurement reports as requested by an AP in infrastructure mode. Note that, in IEEE 802.11, measurement reports include SSIDs, basic service set identifications (BSSIDs), and received signal strength indications (RSSI), amongst other information.

Next, the mobile AP operates to compare one of the received network identifiers with one or more predetermined network identifiers stored in memory (step 714 of FIG. 7). In one embodiment, the mobile AP has a plurality of predetermined network identifiers stored in the memory for comparison with the received network identifier in step 714. More particularly, the mobile AP includes a memory for storing a preferred network profile list, and this preferred network profile list includes the one or more of the predetermined network identifiers which may be used for comparison in step 714. The preferred network profile list is the same preferred network profile list utilized by the mobile terminal for maintaining network prioritization for the selection of a wireless network within coverage when operating in the client mode of operation.

If a match is identified between the received network identifier and any one of the stored predetermined network identifiers (step 716 of FIG. 7), then the mobile AP operates to disable or terminate the AP mode of operation (step 718 of FIG. 7). Further, the mobile terminal may set its mode of operation to a client mode of operation (step 720 of FIG. 7). Here, the mobile terminal may then operate for communications as a client terminal with an AP of an available WLAN, if needed.

If there is no match identified in step 716, then the mobile AP maintains operation in the AP mode, and identifies whether there are additional received network identifiers to process (step 722 of FIG. 7). If there are additional received network identifiers identified in step 722, then the mobile AP selects the next received network identifier and repeats steps 714 and 716. If there are no additional received network identifiers to process in step 722, then the mobile AP maintains operation in the AP mode, sets the timer to the initial value and runs the timer again at steps 706, thereby regularly repeating the process.

In one variation of steps 714 and 716, the network information received by the mobile AP includes a security setting associated with each received network identifier, and the mobile AP further operates to compare whether the received security setting of the received network identifier matches the known or stored security setting in the preferred network profile list. If the security settings match, then steps 718 and 720 are performed; otherwise, steps 718 and 720 are not performed.

In another variation, only those network identifiers in the preferred network profile list that correspond to "enterprise" networks and are correspondingly designated as such in the list are utilized by the mobile AP for comparison/matching in steps 714 and 716. Each network identifier in the preferred network profile list may include a bit indication which is defined to have a setting of "1" for designation of an "enterprise" network, or a setting of "0" for designation of a "non-enterprise" network, for example.

As yet another variation of the technique, the mobile AP may disable the AP mode in response to identifying that a received network identifier corresponds to a predetermined type of wireless network, without use of the comparing and matching of stored network identifiers in memory or preferred network profile list. In particular, the mobile AP may operate to disable the AP mode in response to assessing from the network information that a nearby network is a predetermined type of wireless network and, in particular, a (large) enterprise network.

As a more specific example of this variation, the network information may further include one or more access point identifiers, and each received access point identifier is associated with a received network identifier. In IEEE 802.11, an access point identifier is a basic service set identifier ("BSSID"), which is the MAC address of an access point. In the technique, the mobile AP may operate to tally or count the number of different received access point identifiers that are associated with the same received network identifier. For example, three (3) or four (4) different received BSSIDs may be associated with the same SSID. The mobile AP will identify if the number exceeds a predetermined number (e.g. 2, 3, or 4) and, if so, the mobile AP will identify that the received network identifier corresponds to the predetermined type of wireless network (i.e. a large "enterprise" network), and disable the AP mode of operation.

As yet another alternative variation of the technique, the mobile AP may operate disable the AP mode in response to identifying that even (a single) one of the received network identifiers fail to match any stored predetermined network identifiers. That is, the mobile AP may operate to maintain operation in the AP mode if all surrounding networks are identified to be in its preferred network profile list, but disable the AP mode of operation if any single surrounding network is not found in its preferred network profile list.

Figure 6:
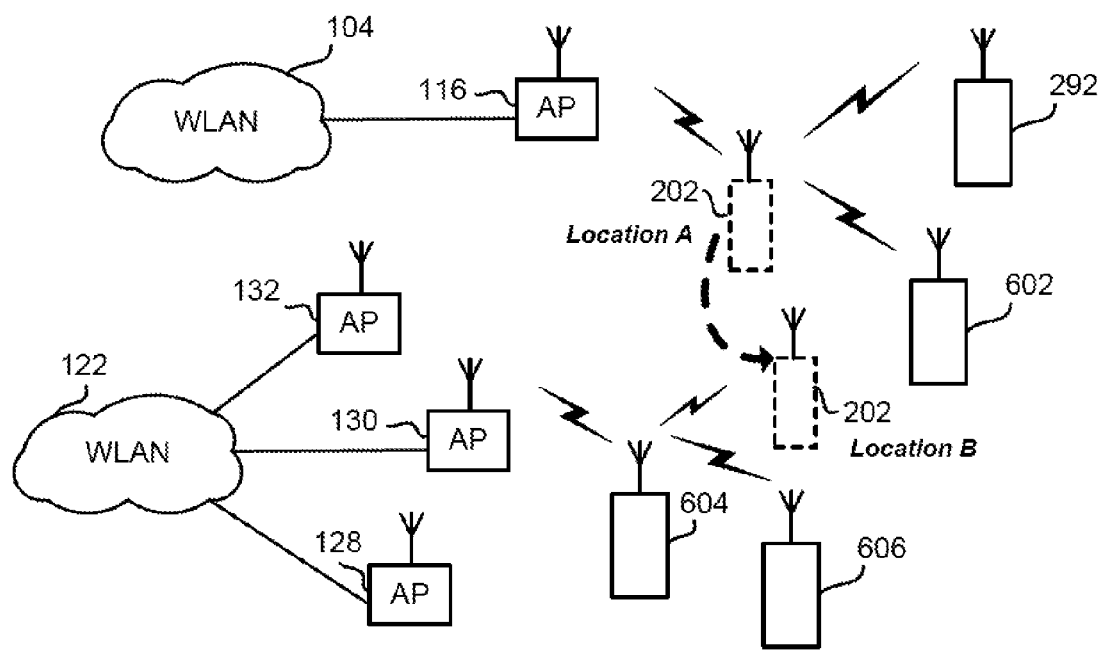
FIG. 6 is an illustration scenario in the communication system in which the mobile device may utilize a technique for controlling an AP mode of operation.

For better illustrating the technique of FIG. 7, with reference now back to FIG. 6, an illustrative scenario in the communication system in which mobile device 202 may utilize the technique of FIG. 7 for controlling its AP mode of operation is shown. In the example of FIG. 6, WLAN 122 is a network of a predetermined type (e.g. WLAN 122 is an enterprise network) whereas WLAN 104 is not of the predetermined type (e.g. WLAN 104 is not an enterprise network).

Mobile device 202 is initially operating in the AP mode of operation at a "Location A" designated in FIG. 6. Mobile devices 292 and 602 are associated with and in direct communications with mobile device 202, and mobile device 202 is communicating/relaying data for mobile devices 292 and 602 via AP 116 of WLAN 104. Although mobile devices 602 and 606 are within coverage of AP 130 of WLAN 122, mobile devices 292 and 602 are not within coverage of WLAN 122. That is, when mobile devices 292 and 602 perform scanning operations and obtain measurement reports, the measurement reports include network information (e.g. network identifiers, access point identifiers, etc.) corresponding to WLAN 104, but fail to include network information corresponding to WLAN 122. Mobile device 202 therefore receives the network information corresponding to WLAN 104, but not the network information corresponding to WLAN 122, and therefore maintains the AP mode of operation at Location A.

Over time, however, mobile device 202 is moved to a "Location B" designated in FIG. 6. A new mobile device, mobile device 604 which is in coverage of WLAN 122, associates with and becomes in direct communications with mobile device 202. When mobile device 604 performs a scanning operation and obtains a measurement report, the measurement report includes the network information (e.g. network identifiers, access point identifiers, etc.) corresponding to WLAN 122. Mobile device 202 therefore receives the network information corresponding to WLAN 122, and therefore disables the AP mode of operation at Location B.

Another embodiment is now described, different from the technique described in relation to FIG. 6. Again, this technique may be performed by mobile device 202 described in relation to FIGS. 1-5 and utilize the environment, components, and associated devices as described. In general, such technique may be performed by one or more controllers or processors of the mobile terminal with use of its RF transceiver. A computer program product which may embody the technique may include a computer readable medium (e.g. memory of the communication device, computer disk, CD-ROM, etc.) having computer instructions stored therein which are executable by the one or more processors of the mobile terminal for performing the technique.

Initially, the mobile terminal enters into an access point (AP) mode of operation, as previously described. Upon entering the AP mode of operation, the mobile terminal sets a timer to an initial value and runs the timer. The timer will be utilized to trigger the action of obtaining a "real-time" geographic location of the mobile terminal. The geographic location may be data in the form of geographic coordinates, such as latitude and longitude coordinates. The geographic location of the mobile terminal may be obtained through use of a Global Positioning System (GPS) receiver of the mobile AP, with communication with GPS satellites, as is well-known in the art. Here, the GPS position information may be obtained via the GPS receiver from the GPS satellites. The geographic location may be obtained with the assistance of a cellular telecommunications network, where the mobile terminal includes a cellular transceiver.

The mobile terminal may maintain storage, in memory, of a data table which associates various geographic locations with wireless networks which are located or accessible in the geographic locations. For example, the data table may associate geographic coordinates with network identifiers corresponding to wireless networks located or accessible in the geographic location. A software module or engine in the mobile terminal may be utilized with the data table for the purpose of identifying the (enterprise) wireless networks in the terminal's geographic location. For example, the software module or engine may be configured to receive an input comprising the geographic location (e.g. coordinates) of the mobile terminal, process the received geographic coordinates by identifying one or more network identifications associated with the coordinates, and then provide an output comprising one or more network identifications corresponding to the wireless networks located in the geographic location.

The wireless networks stored in the data table may be enterprise network types only or, alternatively, may include various types of wireless networks (e.g. both enterprise network types and non-enterprise network types). If the wireless networks stored in the data table are enterprise network types only, then the mobile terminal operates to disable or terminate the AP mode of operation upon identifying one or more of them stored in associated with the geographic location provided. Here, the mobile terminal may then operate for communications as a client terminal with an AP of an available WLAN, if needed. If there is no enterprise network identified, then the mobile terminal maintains operation in the AP mode, and sets the timer to the initial value and runs the timer again, thereby regularly repeating the process.

On the other hand, if the wireless networks stored in the data table include both enterprise network types and non-enterprise network types, then the information in the data table may further include data indications on whether these wireless networks are enterprise or non-enterprise network types. For example, a data indication of "1" may indicate that at least one enterprise network is located at the geographic location or a data indication of a "0" may indicate that no enterprise network is located at the geographic location. Then, the mobile terminal may further identify whether any one of the identified wireless networks at the geographic location is an enterprise network type. If one of the identified wireless networks is identified an enterprise network type, then the mobile terminal operates to disable or terminate the AP mode of operation. Further, the mobile terminal may set its mode of operation to a client mode of operation. Here, the mobile terminal may then operate for communications as a client terminal with an AP of an available WLAN, if needed. If there is no enterprise network identified, then the mobile terminal maintains operation in the AP mode, and sets the timer to the initial value and runs the timer again, thereby regularly repeating the process.

Instead of using GPS, the geographic location of the mobile terminal may alternatively be obtained by performing a scanning operation with use of a cellular transceiver of the mobile terminal. Through the scanning operation, the mobile terminal may receive one or more cell IDs which identify one or more cells of one or more cellular telecommunication networks within which the mobile terminal is located. A cell ID (or a set of cell IDs) obtained through the scanning operation may be understood as defining a geographic location of the mobile terminal. Thus, the data table stored in the terminal's memory may associate various cell IDs (or sets of cell IDs) with wireless networks which are located or accessible within the corresponding cell (or corresponding set of cells). Operation may be the same or substantially the same as that described above.

In a variation of the above techniques which utilize geographic location of the mobile terminal, the geographic location may again be obtained using GPS or cellular networks as described previously. However, instead of the mobile terminal storing a data table which associates geographic locations with network identifiers, the data table may associate the geographic locations merely with data indications which indicate whether or not at least one wireless network of the enterprise network type is located at the geographic location. For example, the software module or engine may return a "1" to indicate that at least one enterprise network is located at the geographic location or return a "0" to indicate that no enterprise network is located at the geographic location.

In yet another variation of the above techniques which utilize geographic location, the software module or engine and the data table may be located at a remote server (e.g. accessible via a wireless network or cellular network), where the mobile terminal may send a request which includes its geographic location and receive network identifiers (or indications on whether at least one enterprise network is located at the geographic location) in response.

Thus, techniques for use in controlling an access point mode of operation of a mobile terminal have been described. Initially, the mobile terminal operates in the access point mode of operation for communication with one or more other mobile terminals. While operating in the access point mode, the mobile terminal receives, from the one or more other mobile terminals, network information comprising one or more network identifiers which identify one or more other wireless networks within coverage of the one or more other mobile terminals. The mobile terminal disables the access point mode of operation in response to identifying that at least one of the received network identifiers corresponds to a predetermined wireless network or predetermined type of wireless network. In one example, the mobile terminal is operative in accordance with IEEE 802.11, the received network identifiers comprise service set identifiers (SSIDs), and the predetermined wireless network is an enterprise network.

Other techniques for use in controlling an access point mode of operation of the mobile terminal have also been described. Initially, the mobile terminal operates in the access point mode of operation for communication with one or more other mobile terminals. While operating in the access point mode, the mobile terminal requests and receives its geographic location. Next, the mobile terminal identifies, from a data table, whether one or more network identifiers corresponding to one or more wireless networks of a predetermined type are associated with the geographic location. The mobile terminal disables the access point mode of operation in response to identifying that one or more wireless networks of the predetermined type are located in the geographic location. Alternatively, the mobile terminal may identify, from a data table, whether indications of whether one or more wireless networks of the predetermined type are associated with the geographic location.

The above-described embodiments of the present disclosure are intended to be examples only. Those of skill in the art may affect alterations, modifications and variations to the particular embodiments without departing from the scope of the application. In other environments or embodiments, for example, the mobile terminal may disable the access point mode of operation based on other network information which is different from network identifiers. For example, the network information may be or include an indicator that a surrounding wireless network is an enterprise network (e.g. the determination being made in or by the network, or in or by another mobile terminal based on information obtained via a scanning operation) or otherwise disallows the access point mode of operation. Alternatively, the mobile terminal may deduce from the network information that the access point mode of operation is disallowed or should be disabled. The invention described herein in the recited claims intends to cover and embrace all suitable changes in technology.

What is claimed is:

1. A method for use in controlling an access point mode of operation of a mobile terminal, the method comprising:
   operating the mobile terminal in an access point mode of operation, for communication with one or more other mobile terminals which are associated with the mobile terminal;
   receiving, at the mobile terminal while operating in the access point mode of operation, from the one or more other mobile terminals, network information comprising one or more network identifiers which identify one or more infrastructure wireless networks within coverage of the one or more other mobile terminals, the network information also comprising an access point identifier associated with each received network identifier; and
   in response to identifying by the mobile terminal that at least one of the received network identifiers corresponds to a predetermined infrastructure wireless network or predetermined type of infrastructure wireless network, disabling the access point mode of operation by the mobile terminal;
   wherein identifying that at least one of the received network identifiers corresponds to a predetermined infrastructure wireless network or predetermined type of infrastructure wireless network comprises counting a number of different access point identifiers that are associated with the same received network identifier and identifying that the received network identifier corresponds to the predetermined type of infrastructure wireless network when the number exceeds a predetermined number.

2. The method of claim 1, wherein the mobile terminal is operative in accordance with IEEE 802.11, and the received network identifiers comprise service set identifiers (SSIDs).

3. The method of claim 1, wherein the mobile terminal comprises a memory for storing a preferred network profile list, and the preferred network profile list comprises one or more stored network identifiers which includes a predetermined network identifier corresponding to the predetermined infrastructure wireless network, the method further comprising:
   comparing each one of the network identifiers with the one or more stored network identifiers in the preferred network profile list.

4. The method of claim 1 wherein the mobile terminal comprises a memory for storing a preferred network profile list, the preferred network profile list comprises one or more stored network identifiers which include a predetermined network identifier corresponding to the predetermined infrastructure wireless network, the predetermined network identifier being designated in the preferred network profile list as an enterprise network.

5. The method of claim 1, further comprising:
   sending a request for the network information to the one or more other mobile terminals that are associated with the mobile terminal; and
   receiving the network information from the one or more other mobile terminals in response to the sending.

6. The method of claim 1, further comprising:
   sending one or more requests for a measurement to the one or more other mobile terminals that are associated with the mobile terminal; and
   receiving one or more measurement reports from the one or more other mobile terminals in response to the sending, the measurement reports including the network information comprising the one or more network identifiers.

7. The method of claim 1, further comprising:
   maintaining operation in the access point mode of operation in response to identifying at the mobile terminal that none of the received network identifiers corresponds to the predetermined infrastructure wireless network or the predetermined type of infrastructure wireless network.

8. The method of claim 1, which is embodied as computer instructions stored in a non-transitory computer readable medium, the computer instructions executable by one or more processors of the mobile terminal for performing the method.

9. The method of claim 1, wherein the mobile terminal, while operating in the access point mode of operation, is unable to scan for network identifiers identifying infrastructure wireless networks.

10. A mobile terminal, comprising:
a radio frequency (RF) transceiver module;
one or more processors coupled to the RF transceiver module;
the one or more processors being configured to:
operate the mobile terminal in an access point mode of operation for communication with one or more other mobile terminals which are associated with the mobile terminal;
receive, during the access point mode of operation, from the one or more other mobile terminals, network information comprising one or more network identifiers which identify one or more infrastructure wireless networks within coverage of the one or more other mobile terminals, the network information further comprising an access point identifier associated with each received network identifier; and
in response to identifying that at least one of the received network identifiers corresponds to a predetermined infrastructure wireless network or predetermined type of infrastructure wireless network, disable the access point mode of operation;
wherein identifying that at least one of the received network identifiers corresponds to a predetermined infrastructure wireless network or predetermined type of infrastructure wireless network comprises counting a number of different access point identifiers that are associated with the same received network identifier and identifying that the received network identifier corresponds to the predetermined type of infrastructure wireless network when the number exceeds a predetermined number.

11. The mobile terminal of claim 10, which is operative in accordance with IEEE 802.11.

12. The mobile terminal of claim 10, wherein a memory of the mobile terminal is for storing a preferred network profile list, the preferred network profile list comprises one or more stored network identifiers which includes a predetermined network identifier corresponding to the predetermined infrastructure wireless network, and the one or more processors are further configured to compare each one of the received network terminals identifiers with the one or more stored network identifiers in the preferred network profile list.

13. The mobile terminal of claim 10, wherein a memory of the mobile terminal is for storing a preferred network profile list, the preferred network profile list comprises one or more stored network identifiers which include a predetermined network identifier corresponding to the predetermined infrastructure wireless network, and the predetermined network identifier being designated in the preferred network profile list as an enterprise network.

14. The mobile terminal of claim 10, wherein the one or more processors are further configured to send a request for the network information to the one or more other mobile terminals and receive the network information in response to the sending.

15. The mobile terminal of claim 10, wherein the one or more processors are further configured to send one or more requests for a measurement report to the one or more other mobile terminals, and to receive one or more measurement reports from the one or more other mobile terminals in response to the sending, the measurement reports including the network information comprising the one or more network identifiers.

16. The mobile terminal of claim 10, wherein the one or more processors are further configured to maintain operation in the access point mode of operation in response to identifying at the mobile terminal that none of the received network identifiers corresponds to the predetermined infrastructure wireless network or the predetermined type of infrastructure wireless network.

17. The mobile terminal of claim 10, wherein the received network identifiers comprise service set identifiers (SSIDs).

18. The mobile terminal of claim 10, wherein the one or more processors are further configured to enable a client terminal mode of operation in response to identifying that at least one of the received network identifiers corresponds to the predetermined infrastructure wireless network or the predetermined type of infrastructure wireless network.

19. The mobile terminal of claim 10, wherein the one or more processors are further configured to disable the access point mode of operation in response to identifying at least one of the received network identifiers corresponds to the predetermined type of infrastructure wireless network.

20. The mobile terminal of claim 10, wherein the mobile terminal, while operating in the access point mode of operation, is unable to scan for network identifiers identifying infrastructure wireless networks.

* * * * *